June 6, 1972  J. A. RADER  3,667,821
GUIDANCE AND RETENTION CAGE FOR SPHERICAL
ROLLER BEARING
Filed Nov. 4, 1970
2 Sheets-Sheet 1
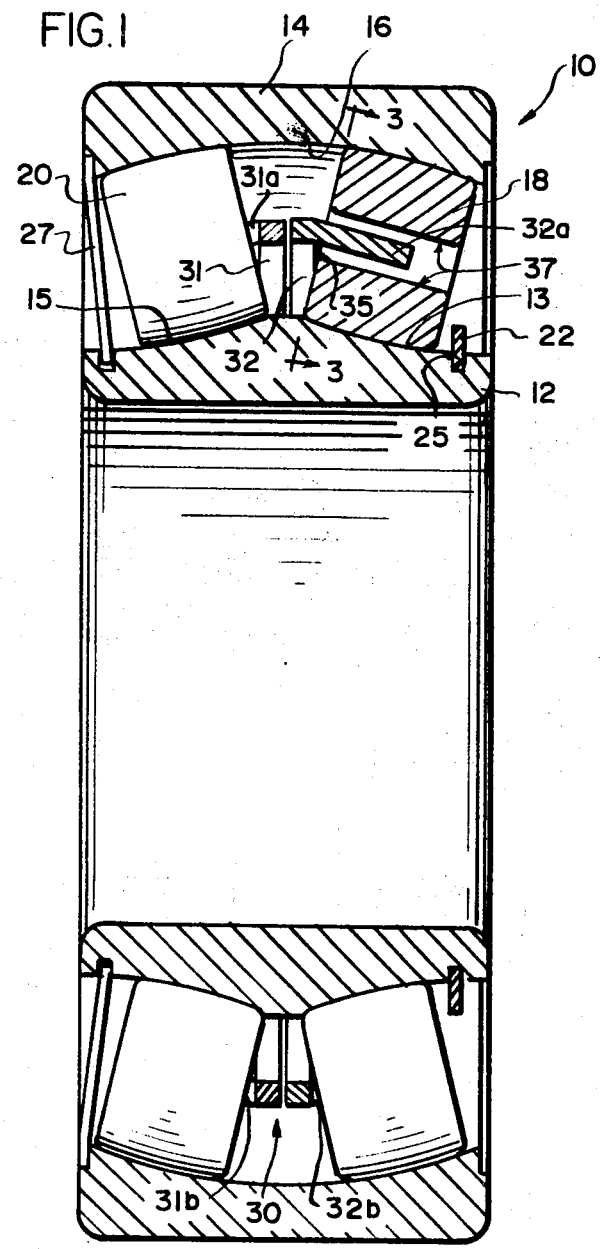
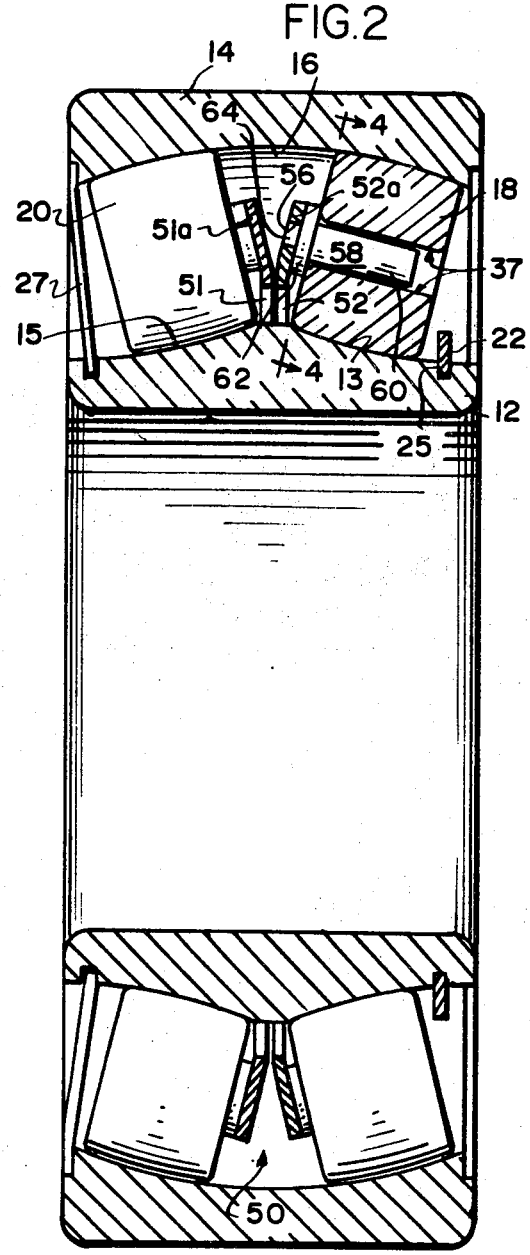
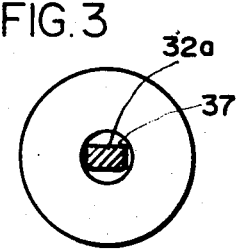
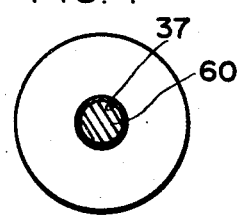
INVENTOR.
JAMES A. RADER
BY Mueller & Aichele
ATTORNEYS.

United States Patent Office 3,667,821
Patented June 6, 1972

3,667,821
GUIDANCE AND RETENTION CAGE FOR
SPHERICAL ROLLER BEARING
James A. Rader, Valparaiso, Ind., assignor to McGill
Manufacturing Company, Inc., Valparaiso, Ind.
Filed Nov. 4, 1970, Ser. No. 86,790
Int. Cl. F16c 25/08
U.S. Cl. 308—212                                    13 Claims

ABSTRACT OF THE DISCLOSURE

A cage device for a spherical roller bearing includes an annular ring which is positioned at one outboard axial end of the bearing or two such rings which are positioned between the rows of rolling elements in the raceway of a two-row spherical roller bearing. The annular rings have a plurality of pins or prongs extending axially outwardly therefrom. Each of the prongs extend into a bore in a respective roller. The cross-section of the prong is only slightly less than the diameter of the bore in the roller such that the prong and walls of the bore are in a close running fit in an operating installation. The prongs not only retain the rollers in the bearing raceway, but the close running fit between the prong and the bore also serves to guide the roller. In turn the rollers act to pilot the cage.

BACKGROUND OF THE INVENTION

This invention pertains generally to a spherical roller bearing and more particularly to a cage for retaining and guiding the rollers within the bearing raceway.

In two-row spherical roller bearings and spherical roller thrust bearings, the length to diameter ratio of the roller element is almost always less than one. Because of this, it is difficult in a window-type or a partial-window-type (wherein prongs engage external contours of the rolling elements) cage to both retain the rollers and to accurately guide the same. Since the width of the pocket is greater than the length of the roller, it is very difficult for a window-type cage to provide the necessary resistance of skewing of the roller. Therefore, spherical roller bearings have generally been designed with roller guidance surfaces associated with one of the bearing racerings. In some cases, these roller guidance surfaces are portions of flanges integral with one of the racerings. In other cases, the roller guidance surfaces are associated with a floating ring piloted on one of the racerings.

SUMMARY OF THE INVENTION

It is an object of this invention to provide an improved cage device for a spherical roller bearing which not only retains the rollers in the bearing raceway but also positively guides the same.

It is another object of this invention to provide an improved spherical roller bearing which can be economically manufactured.

In one embodiment of this invention, a cage device is positioned in the raceway between the first and second rows of rollers in a two-row spherical roller bearing. The cage device includes a plurality of integral prongs each one of which engages a respective roller in a bore through the center of the roller which is located substantially at the roller pitch circle. Each prong has cross-section only slightly smaller than the diameter of the bore such that the same operate in a close running fit. In an operating installation the prongs act to retain the rollers in the raceway and the close running fit between the prongs and the walls of the bore prevent the rollers from skewing so the prongs also guide the rollers in the bearing raceway.

In another embodiment the annular cage device is located at the outboard axial end of a single row, angular contact spherical roller bearing. The integral prongs of the cage engage the respective rollers in bores through the center thereof in a close running fit. In an operating installation not only do the prongs act to retain the rollers in the raceway, but the coaction between the prongs and the walls of the roller bores acts to pilot the cage.

BRIEF DESCRIPTION OF THE DRAWINGS

FIG. 1 is a cross-section view in elevation of a two-row spherical roller bearing in accordance with this invention;

FIG. 2 is a cross-section view in elevation of a two-row spherical roller bearing illustrating a further embodiment of this invention;

FIG. 3 is a cross-section view taken along the lines 3—3 of FIG. 1;

FIG. 3 is a cross-section view taken along the lines 4—4 of FIG. 2; and

Figure 5:
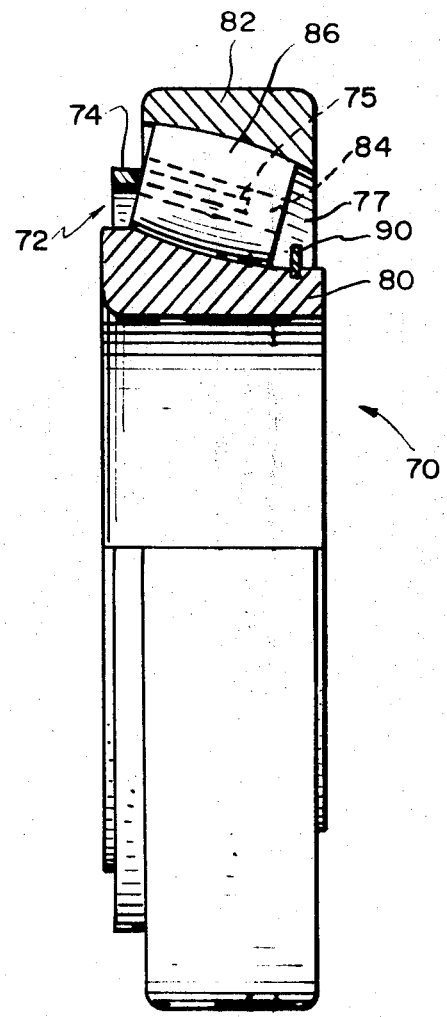
FIG. 5 is a cross-section view in elevation of a single row, angular contact spherical roller bearing illustrating a still another embodiment of this invention.

It is to be understood that in the specification and throughout the claims the term "spherical roller bearing" refers to a bearing wherein corresponding raceways have a curvature in the axial or transverse direction to provide spherical or elliptical bearing surfaces, with so called barrel rollers, also having a spherical or elliptical curvature, disposed therebetween. Such a bearing is deemed "two-row" when there are two banks of rollers disposed between the raceways.

Referring now specifically to the drawings, in FIG. 1 bearing 10 has an inner racering 12 and an outer racering 14. Inner racering 12 includes two annular raceway portions 13 and 15, while outer racering 14 includes the annular raceway 16. The raceways 13, 15 and 16 are curved in the axial direction of the bearing, with the radius of curvature of raceway 16 being equal to one-half the diameter of raceway 16. When racerings 12 and 14 are in an assembled condition the raceway portions 13 and 15 cooperate with the raceway 16 to provide a bearing surface for a plurality of barrel rollers such as 18 and 20. The rollers 18 and 20 have spherical or elliptical curved surfaces extending in their axial or transverse direction and may have substantially flat end surfaces.

The tilt of inner racering 12 with respect to outer racering 14 may result in the axial ends of rollers 18 being restricted by snap ring 22 and by the seal 27 (an optional feature) which is shown in the opposite radial end of the bearing 10. It should be apparent from the curved bearing surfaces provided by the raceways 13, 15 and 16 that the bearing assembly can be disassembled only by tilting the inner racering with respect to the outer racering, and such tilt is restricted by the seal 27 to maintain a unit assembly. In place of the seal 27 one could insert a snap ring to perform this function. Snap ring 22 and the seal 27 do not, however, contact the roller ends in a normal operating installation.

Positioned in the raceway between the first and second rows of barrel rollers is a cage device 30. The cage includes first and second annular members 31 and 32 which are coaxially positioned adjacent one another and between the two rows of rollers. Each of the annular members have a plurality of integral prongs 31a, 31b and 32a, 32b for example, spaced about the annular face 35, for instance, and extending axially outwardly therefrom.

Referring to roller 18 which is typical of all the rollers in the bearing, there is shown a hole or bore 37 which extends through the roller at the center thereof, which is located substantially at the pitch circle of the roller. As shown in FIG. 3, the cross-section of prong 32a is only slightly smaller than the diameter of the bore 37 such that in an operating installation they cooperate in a close running fit. The snap ring 22 acts to keep the rollers on the prongs of the cage device should the inner ring-roller assembly be misaligned outside the outer raceway contour.

It can be seen, therefore, that the prongs on the annular cage members act to retain the rollers in the bearing raceway. At the same time, because of the close tolerance between the prong and the walls of the bore in the roller, they also serve to provide roller guidance, for any skewing of the roller will be prohibited by the prong engaging the walls of the bore. Furthermore, two-row spherical roller bearings using the cage device heretofore disclosed are able to sustain greater loads than their prior counterparts. This is effected by centrally locating the pins thereby removing the necessity of having cage material between the rollers such as in the window-type or partial-window-type cage. This permits a greater number of rollers to be positioned in the bearing raceways. In addition the hollow roller gives a resiliency effect that dictates a slightly larger area of roller contact between the roller and racerings which acts to reduce race stresses and increases the performance life of the bearing. Performance is further enhanced by the fact that the angled roller with the central bore will act as a lubricant pump due to the angled relationship of the roller axis to the bearing axis. This pumping effect of the bore arrangement insures that the cage prongs have adequate lubrication as they contact the bore of the roller. This almost eliminates the possibility of wear of the prongs so that the guidance and retention characteristics of the cage do not change during the life of the bearing.

The cage members 31 and 32 of FIG. 1 are constructed from a single piece of flat stock strip material or tubing wherein the prongs are punched therefrom and the stock is then formed into a circle and welded. The prongs in this configuration therefore are located in a spaced relation about the periphery of the annular rings 31 and 32 and are bent at an angle such that they enter the bore of the roller substantially normal to the roller end.

Referring to FIG. 2 there is illustrated a further embodiment of this invention. Parts of the bearing in FIG. 2 which correspond to those same parts in FIG. 1 are given similar numbers. In this figure the cage device 50, which has first and second annular members 51 and 52, performs in the same manner as the cage 30 illustrated in FIG. 1; however, the construction of this cage is quite different.

In the cage 50 there are a plurality of portions such as 51a and 52a which are located about the periphery of the annular members 51 and 52 and bent outwardly therefrom as viewed in the operating installation of FIG. 2 such that they are substantially parallel with the ends of the rollers 18 and 20. As shown in portion 52a, after the annular members are fabricated, a stud 58 is connected integral with the portion 52a to act in a fashion similar to the prongs 31a and 32a of the embodiment of FIG. 1. The stud 58 includes a cylindrical body portion 60 which fits into the bore 37 in the roller 18. As can be seen in FIG. 4, the cross-section of the body portion 60 of the stud 58 is only slightly smaller than the diameter of the bore 37 such that they cooperate in a close running fit in an operating installation.

Integral with the body portion 60 of the stud 58 is a flange 62 and connected to the flange 62 is an integral pin 64. After the annular member 52, for instance, is fabricated and the aperture 56 is punched in the bent portion 52a, the pin 54 of the stud 58 is press fit into the aperture 56 to connect the stud to the annular member 52. The stud body 60 then extends normal to the end face of the roller 18 and into the bore 37. In this position the flange 62 keeps the body portion 60 of the stud 58 from moving either farther into or out of the bore 37.

Although the cage devices 30 and 50 are illustrated comprising two separate annular members cooperating to form the same, it is entirely within the scope of this invention for the cage device to be made from a single annular body portion with the prongs extending axially outwardly from either annular face to engage both rows of rollers. Furthermore, although two preferred ways of fabricating the cage are shown, it should be understood that there are other ways of fabricating the cage, for instance, the cage could be cast with the studs being machined thereafter to proper dimensions.

FIG. 5 illustrates still another embodiment of this invention incorporated into a single row, angular contact spherical roller bearing 70. Generally, angular contact bearings are constructed such that one axial end of the inner racering, for instance, does not have a radially extending shoulder and guidance for the rollers is provided by a radially extending shoulder on the opposite end of the inner racering. In accordance with this invention, however, this radially extending shoulder is eliminated and both roller guidance and retention is provided by the cage device 72.

More specifically, the cage device 72 is similar to one of the annular members 31 and 32 of cage device 30, and includes an annular ring 74 having a plurality of prongs 75, for instance, which extend axially outwardly from the radial face of the ring 74 in a spaced relation to one another. There being one prong for each roller. The cage device 72 is constructed from a single piece of flat stock, strip material wherein the prongs are punched therefrom and the stop is then formed into a circle and welded. It should be understood, of course, that there are other acceptable ways of fabricating the cage device.

In an operating installation, the cage device 72 is positioned in the bearing raceway 77, which is formed by the inner and outer racerings 80 and 82 respectively. Each of the prongs 75 of the cage device 72 are positioned in a bore 84 of a respective roller 86, which bore extends through the rollers at the center thereof that is located substantially at the pitch circle of the roller.

The prong 75 rides in a close running fit with the walls of the bore 84 in a manner similar to that depicted in FIG. 3. The prongs 75 of the cage device 72 act as retainers for the rollers in the bearing raceway 77 and also guide the rollers to prevent them from skewing. The prongs and the walls of the roller bores also coact to pilot the cage device 72 within the raceway. The snap ring 90 acts to keep the rollers from falling off the prongs when the inner ring and roller assembly are misaligned.

What has been described, therefore, is an improved, economical cage device for a spherical roller bearing which not only retains the rollers in the bearing raceway but also positively guides the same.

I claim:

1. A spherical roller bearing having inner and outer racerings defining a raceway and lubricant holding space and including a pluality of spherical rollers positioned in the raceway the combination including, cage means including a plurality of integral prongs, each prong having one end connected to said cage means and the the other end extending axially outwardly therefrom in cantilever fashion, each one of said prongs for engaging a respective roller positioned in the raceway, each said prong engaging one end of a respective roller in a bore through the center of the roller which is located substantially at the pitch circle thereof, and each said prong having a cross-section only slightly smaller than the diameter of the bore such that the same operate in a close running fit, whereby in an operating installation said prongs retain the rollers in said raceway and the close runnnig fit between the prongs and the walls of the bore coact such that the prongs act to guide said rollers.

2. The spherical roller bearing of claim 1 wherein the bearing is of the single row, angular contact type, and wherein said cage means is positioned at one outboard axial end of the bearing.

3. The spherical roller bearing of claim 1 wherein the bearing is a two-row spherical roller bearing, and wherein said cage means is positioned in the raceway between the first and second rows of the rollers.

4. The spherical roller bearing of claim 1 wherein said cage means is an annular member having a plurality of integral prongs, said prongs being spaced about a face of said annular member and extending axially, outwardly therefrom, and wherein the end of each roller opposite from said one end which is engaged by said prong is at a lower level in the raceway than said one end, and the bore at said opposite end is open whereby the lubricant passes freely up the bore in said roller to insure proper lubrication of said prong and the contact surfaces it engages within said roller.

5. A two-row spherical roller bearing having inner and outer racerings defining a raceway and including a plurality of spherical rollers positioned in two rows in the raceway the combination including, cage means positioned in the raceway between the first and second rows of said rollers, said cage means including a plurality of integral prongs, each one of said prongs being connected at one end to said cage means and extending axially outwardly therefrom in cantilever fashion, each prong for engaging a respective roller positioned in one of the two rows, each said prong engaging a respective roller in a bore through the center of the rollers which is located substantially at the pitch circle thereof, and each said prong having a cross-section only slightly smaller than the diameter of the bore such that the same operate in a close running fit, whereby in an operating installation said prongs retain the rollers in said raceway and the close running fit between the prongs and the walls of the bore prevents the rollers from skewing so said prongs also guide the rollers in the raceway.

6. The two-row spherical roller bearing of claim 5 wherein said cage means includes first and second annular members coaxially positioned adjacent one another and between the two rows of rollers, each said annular members having a plurality of integral prongs, said prongs being spaced about a face of said annular member and extending axially outwardly therefrom.

7. The two-row spherical roller bearing of claim 6 wherein said first and second annular members each comprise an annular fabricated cage, and said integral prongs are individual metal studs press fit into said cage in a spaced relation about an annular face thereof.

8. The two-row spherical roller bearing of claim 7 wherein said studs have a flange portion with a diameter greater than the diameter of the bore in said rollers, a body portion for insertion into the bore in said rollers, and a pin portion which is press fit into said fabricated cage, said flange portion located intermediate said pin and body portions and being positioned respectively against the surface of said roller about the bore therethrough and the cage to prevent said body portion from moving into and out of the bore in said roller.

9. The two-row spherical roller bearing of claim 6 wherein said first and second annular members each comprise an integral annular ring and prong assembly formed from a single piece of stock.

10. A two-row spherical roller bearing having inner and outer racerings defining two spherical raceways and including a plurality of barrel shaped rollers positioned in each of the raceways and each roller having a bore therethrough, the combination including first and second annular rings positioned about the inner racering intermediate said spherical raceways, each of said rings including a plurality of integral prongs extending axially outwardly therefrom in cantilever fashion in a spaced relation to one another, each of said prongs engaging a respective roller in the bore thereof in a close running fit, said prongs acting to retain the rollers in each of said raceways and guiding the same thereabout in an operating installation.

11. The two-row spherical roller bearing of claim 10 wherein each of said annular rings have a plurality of portions at the outer periphery thereof bent outwardly therefrom in an operating installation, said prongs being integral with said outwardly bent portions and extending in a manner substantially normal to the ends of the rollers into the bores therein, and said cross-section of said prongs being only slightly smaller than the diameter of the bores so the same operate in a close running fit.

12. The two-row spherical roller bearing of claim 11 wherein said bent portion, said prong and said ring are portions of the same piece of material.

13. The two-row spherical roller bearing of claim 11 wherein said bent portions are formed at the periphery of said annular rings and have an aperture therethrough, said prong is a stud having a body portion with a diameter slightly less than the diameter of the bore in the rollers, a flange portion having a diameter greater than said body portion, and a head portion having a diameter less than said body portion, said head portion being press fit into the aperture of said bent portion of said ring to connect the same thereto, said body portion being in the bore of said roller in a close running fit therewith in an operating installation, with said flange portion prohibiting said body portion from moving in either axial direction in the bore of said roller.

References Cited
UNITED STATES PATENTS

| | | | |
|---|---|---|---|
| 2,622,947 | 12/1952 | Wallgren | 308—214 |
| 2,989,353 | 6/1961 | Nyberg | 308—212 |
| 3,554,622 | 1/1971 | Gaubatz | 308—214 |

MARTIN P. SCHWADRON, Primary Examiner

F. SUSKO, Assistant Examiner